US007026410B2

(12) United States Patent
Estrin

(10) Patent No.: US 7,026,410 B2
(45) Date of Patent: Apr. 11, 2006

(54) SOLVENTLESS METHOD FOR PREPARATION OF CARBOXYLIC POLYMERS

(75) Inventor: Tanya Estrin, Novi, MI (US)

(73) Assignee: Henkel Corporation, Gulph Mills, PA (US)

( * ) Notice: Subject to any disclaimer, the term of this patent is extended or adjusted under 35 U.S.C. 154(b) by 139 days.

(21) Appl. No.: 10/688,257

(22) Filed: Oct. 16, 2003

(65) Prior Publication Data

US 2004/0171742 A1 Sep. 2, 2004

Related U.S. Application Data

(60) Provisional application No. 60/419,264, filed on Oct. 17, 2002.

(51) Int. Cl.
*C08C 19/00* (2006.01)
*C08C 8/12* (2006.01)

(52) U.S. Cl. .................. 525/383; 525/386; 525/331.9; 525/332.5; 525/333.1; 525/333.2

(58) Field of Classification Search ................ 525/383, 525/386, 331.9, 332.5, 333.1, 333.2
See application file for complete search history.

(56) References Cited

U.S. PATENT DOCUMENTS

| | | | | |
|---|---|---|---|---|
| 3,904,588 A | | 9/1975 | Greene | |
| 4,137,083 A | | 1/1979 | Hedrick | |
| 4,175,018 A | | 11/1979 | Gacesa | |
| 4,204,046 A | | 5/1980 | Minatono | |
| 4,218,349 A | | 8/1980 | Minatono | |
| 4,412,031 A | | 10/1983 | Kitahara et al. | |
| 4,496,670 A | | 1/1985 | Vas et al. | |
| 4,542,791 A | | 9/1985 | Drake et al. | |
| 4,585,841 A | | 4/1986 | Eguchi et al. | |
| 4,621,127 A | | 11/1986 | Denzinger et al. | |
| 4,902,577 A | | 2/1990 | Butters et al. | |
| 5,066,749 A | | 11/1991 | Leighton et al. | |
| 5,114,481 A | | 5/1992 | Lynch | |
| 5,248,400 A | | 9/1993 | Franks et al. | |
| 5,300,569 A | | 4/1994 | Drake et al. | |
| 5,407,784 A | * | 4/1995 | Berrier et al. | 430/287.1 |
| 5,435,879 A | | 7/1995 | Knutson et al. | |
| 5,473,025 A | | 12/1995 | Deckers et al. | |
| 5,521,248 A | | 5/1996 | Drake et al. | |
| 5,552,228 A | | 9/1996 | Fong | |
| 5,672,642 A | | 9/1997 | Gros | |
| 5,695,747 A | | 12/1997 | Forestier et al. | |
| 5,824,740 A | | 10/1998 | Yabuki et al. | |
| 5,883,172 A | | 3/1999 | Heucher et al. | |
| 5,977,047 A | | 11/1999 | Carr | |
| 5,985,392 A | | 11/1999 | Hert et al. | |
| 6,106,753 A | | 8/2000 | Redd et al. | |
| 6,124,249 A | | 9/2000 | Seebauer et al. | |
| 6,130,025 A | | 10/2000 | Chikaoka et al. | |
| 6,139,867 A | | 10/2000 | Muraoka | |
| 6,150,428 A | | 11/2000 | Hanley, IV et al. | |
| 6,166,149 A | | 12/2000 | Yamaguchi et al. | |

FOREIGN PATENT DOCUMENTS

| | | | |
|---|---|---|---|
| GB | 1 404 291 | | 6/1972 |
| GB | 1 495 457 | | 3/1975 |
| GB | 1404291 | * | 8/1975 |
| GB | 1495457 | * | 12/1977 |
| JP | 09 299261 | | 8/1997 |

OTHER PUBLICATIONS

International Search Report, PCT/US03/33031, Mar. 2004.

* cited by examiner

*Primary Examiner*—Roberto Rabago
(74) *Attorney, Agent, or Firm*—Stephen D. Harper

(57) ABSTRACT

A solventless process for making a polymeric composition having at least two pendant carboxyl groups, which comprises reacting at least one molecule of water with at least one dicarboxylic acid anhydride group of at least one suitable polymer.

14 Claims, No Drawings

SOLVENTLESS METHOD FOR PREPARATION OF CARBOXYLIC POLYMERS

This Application claims the benefit of U.S. Provisional Application Ser. No. 60/419,264, filed Oct. 17, 2002. The disclosure of Ser. No. 60/419,264 is hereby incorporated by reference.

FIELD OF THE INVENTION

The invention relates to a solventless method for preparing elastomers with multiple pendant carboxyl groups and application of such elastomers for the cured compositions.

BACKGROUND OF THE INVENTION

Carboxyl grafted elastomers are used as such or as co-reactants in a wide range of applications. Grafted carboxyl groups improve adhesion to various polar and nonpolar substrates, compatibility with polar polymers, such as polyamides, polyurethanes, polyesters, acrylic, phenolic and epoxy resins, provide dyeing property, increase filler acceptance, etc. Reactions with carboxyl groups are employed in many crosslinking reactions, e.g., with epoxy, isocyanate, amine, hydroxyl, ester, ether, and polyvalent metal groups.

The applications of these products are extremely versatile. Carboxyl containing polymers are used in hot melt, pressure sensitive and biomedical adhesives; spray, powder and electrodepositional coatings; paints; inks; seals, packings and gaskets; for filler surface treatment; as polymeric binders and compatibilizing agents; for thermoforming and thermosetting articles; in water based systems, for detergents and surfactants preparation; as thickening agents, rheology modifiers, etc. They are used as binders for solid propellant and binders for various fibers and fillers, chip resistant coatings, electrodepositional primers, laminates and adhesives for bonding identical or different materials, such as metals, plastics, rubbers, molding compounds, textile, cement, glass, and wood in various combination and form, e.g., as sheet, fiber, wire, foam, etc.

Carboxyl containing elastomers increase green strength and adhesiveness of rubber compositions and are used in joint sealants, tire formulations, and noise and vibration damping compositions, for example in automotive applications such as an adhesive or a sealant. For such applications it is especially important that the carboxyl containing elastomers are hydrophobic to repel the water and protect the metals from corrosion.

Leighton, et al. in U.S. Pat. No. 5,066,749 assigned to National Starch and Chemical Investment Holding Corporation describes a method for preparation of hydrophobically modified polycarboxylate polymers via copolymerization of unsaturated carboxylic monomers with non-carboxylic monomers having a long hydrocarbon chain, e.g., acrylic and maleic acid with lauryl or stearyl methacrylate, in an organic solvent. Following polymerization, the polymers are extracted into an aqueous solvent and then isolated by azeotropic solvent removal.

This technique has resulted in useful elastomers, but such methods have not received general acceptance for the reason that the process is laborious and complicated.

A random copolymer formed from ethylene, alkyl acrylate and a mono alkyl half-acid ester of 1,4-butenedioic acid can be formed by continuously feeding monomers and initiator to a stirred reaction zone and continuously withdrawing a reaction mixture containing the copolymer. This is reacted for 30 minutes at 180° C. and 40,000-lb pressure. Such a polymer is Vamac sold by E. I. DuPont. The method of making such a polymer is disclosed in U.S. Pat. No. 3,904,588.

This process also requires isolation of the carboxylic polymer from the reaction mixture. The polymers obtained by this method are solids of high molecular weight and the process requires special high-pressure equipment. Another disadvantage of this process is the use of a mono alkyl half-acid ester of 1,4-butenedioic acid as a carboxylic component. It is known that the carboxyl group of such half-acid esters has lower acid strength and therefore limited reactivity as compared to the non-esterified 1,4-butenedioic acid.

It is long known that unsaturated carboxylic acids and their derivatives, such as anhydrides, can be adducted onto polymers via different techniques. For example, maleic anhydride can be added through the reaction of maleic anhydride with a diene polymer. Such a process is thoroughly described in literature, e.g., Trivedi, B. C. and Culbertson, R. M. "Maleic Anhydride" Plenum Press, NY, 1982.

Grafting of polyisoprene resin with maleic anhydride is described in U.S. Pat. No. 4,218,349 assigned to Kuraray, Ltd. The maleinized resin is used in a sulfur cured natural rubber blend to provide improved green strength of the compounds and adhesion to metal. A similar material is described in U.S. Pat. No. 4,204,046 also assigned to Kuraray, Ltd. for use as a constituent of a pressure sensitive adhesive.

Grafting of low molecular weight liquid polybutadiene resins with maleic anhydride is most widely realized on commercial scale. Such maleinized polymers are prepared by reacting polymeric resins, such as, for example, polybutadiene homopolymers or copolymers of styrene and butadiene, with a dicarboxylic acid anhydride, such as maleic anhydride. The maleinized polybutadienes are claimed to improve adhesion of elastomers to various substrates, as described in U.S. Pat. No. 5,300,569 assigned to Ricon Resins, Inc.

The aforementioned patents and publications disclose many methods for modifying elastomers via incorporation of carboxylic acid functionality. Most these methods suffer from mechanical difficulties associated with handling the increasing viscosity of the elastomer during the chemical reaction sequences. In part, the difficulty with processing of such elastomers lies in the high viscosity built upon the addition of acid group to the polymer chain. It is known that even a small number of not terminal carboxyl groups in the polymeric molecule cause interchain hydrogen bonding resulting in sharp increase of the bulk viscosity of the polymer. Therefore, the reactions leading to the formation of carboxylic polymers are usually conducted in organic solvents or in water, with the well known disadvantages associated with these techniques, for example, the necessity to remove the reaction media prior or during the use of the resin, resulting in higher energy use, slow down of the process, and VOC development. Yet another problem is the impossibility of working with high concentrations of polymer without an intolerable increase in the viscosity of the reaction mixture and resulting difficulties in agitation and heat exchange.

A solventless method for the synthesis of carboxylic polymers is described in U.S. Pat. No. 4,412,031 assigned to Nippon Zeon Co., Ltd., where a carboxyl modified rubber is obtained by the reaction of a rubber having an unsaturated carbon linkage with an organic compound having a carboxyl group and an aldehyde group in the presence of an acid catalyst, carried out in a rubber-kneading machine in the absence of a solvent. Such process requires a prolong use of sophisticated mixing equipment, like a kneading machine, and can lead to side-reactions such as gellation of the unsaturated rubber caused by the high processing temperature of about 200° C. or a chain scission caused by shear forces. Besides, the organic compounds used for this process contain an aldehyde group, hence are potentially toxic.

Another solventless method for production of saturated carboxylic polymers is described in U.S. Pat. No. 5,473,025 assigned to BASF Aktiengesellschaft. The method comprises pyrolytic cleavage of ethylene-carboxyl ester copolymers in the presence of an acid catalyst at temperatures between 150 and 250° C. Again, such a process requires high temperature, hence it is difficult to control. The method is limited to ethylene-carboxyl ester copolymers and cannot be used for unsaturated polymers that have insufficient high temperature stability.

Due to the ease of processing, anhydrides of maleic acid group are most widely used to graft or adduct unsaturated elastomers with carboxylic acid derivatives. The anhydrides are less prone to hydrogen bonding, therefore such maleinized elastomers have significantly lower viscosity than their truly carboxylic analogues. These elastomers found application as a replacement for the more difficult to prepare unsaturated carboxylic polymers.

However, the anhydride containing elastomers have some definite shortcomings. For example, maleic anhydride grafted polymers are highly moisture sensitive due to the hydrolysis of the anhydride moiety. Upon the hydrolysis of the anhydride, acid groups are produced changing physical properties of the polymer, e.g., the viscosity increases in the moisture-contact area resulting in "skinning" of the polymer surface. Besides, maleic anhydride adducted to an unsaturated polymer such as a liquid polybutadiene accelerates its oxidative crosslinking to the extent that maleinized polybutadiene resins have been used in air-drying coatings (e.g., see U.S. Pat. No. 5,552,228 assigned to Minnesota Mining and Manufacturing Co.) Therefore, storing and application of unsaturated elastomers containing maleic anhydride usually require nitrogen blanketing to provide moisture and oxygen free environment. Still another drawback of the anhydride functionality compare to the acid form is a much lower tack and adhesiveness of the polymer.

Carboxylic and carboxyl-grafted polymers can be used in a wide range of applications. Examples of such applications comprise hot-melt adhesives (e.g., U.S. Pat. No. 5,883,172); PSA (e.g., U.S. Pat. No. 5,435,879); biomedical adhesives (e.g., U.S. Pat. No. 6,139,867), pumpable adhesives (e.g., U.S. Pat. No. 5,521,248); adhesives for bonding identical or different materials (e.g., U.S. Pat. No. 5,300,569—rubber to metal adhesion, U.S. Pat. No. 5,985,392—thermoplastics to rubber adhesion, and Patent Application JP 09,299,261—polyolefin foam adhesion to steel); laminates of various substrates (e.g., U.S. Pat. No. 0,369,808—plastics, and U.S. Pat. No. 0,296,042—glass); compositions of detergents (e.g., U.S. Pat. No. 5,977,047); powder coatings (e.g., U.S. Pat. No. 5,248,400) and electrocoating (e.g., U.S. Pat. No. 4,175,018); stereolithography aid (e.g., U.S. Pat. No. 6,130,025); filler surface treatment (e.g., U.S. Pat. No. 4,496,670); compatibilizers for not miscible materials (e.g., U.S. Pat. No. 5,672,642—asphalt-polymer blends); golf ball manufacture (e.g., U.S. Pat. No. 5,824,740); sealants (e.g., U.S. Pat. No. 6,150,428); packing (e.g., U.S. Pat. No. 6,106,753); gaskets (e.g., U.S. Pat. No. 4,585,841); paint additives (e.g., U.S. Pat. No. 5,114,481); inks formulation (e.g., U.S. Pat. No. 4,137,083); inkable coating (e.g., U.S. Pat. No. 4,902,577); lubricant additives (e.g., U.S. Pat. No. 6,124,249); cosmetics (e.g., U.S. Pat. No. 5,695,747); various water based formulations (e.g., U.S. Pat. No. 4,542,791—water based sealant) among other applications. The subject matter of the instant invention is also related to U.S. Pat. Nos. 4,412,031; 4,621,127; 5,066,749; 5,473,025 and 6,166,149.

The previously identified patents and publications are hereby incorporated by reference.

Consequently, there is a need in this art for a method of preparing an unsaturated elastomer containing multiple carboxyl groups that overcomes the deficiencies of the prior art noted above. Such an elastomer can be used in crosslinkable compositions to improve the compatibility of the components of the composition, increase the green strength, adhesion and tack.

SUMMARY OF THE INVENTION

The instant invention solves problems associated with conventional practices by providing a method for preparing an unsaturated elastomer containing multiple pendant carboxyl groups.

It is desirable to have a highly functionalized unsaturated carboxylic elastomer, which can provide tack and adhesion to various substrates and can be ionically and covalently crosslinked for improved resistance to both hydrophobic and hydrophilic solvents.

One aspect of the instant invention comprises a method for converting liquid elastomers containing organic acid anhydrides into substantially pure acidic form (e.g. to improve storage stability and adhesiveness). In one aspect the subject invention relates to a solventless process for making a polymeric composition having at least two pendant carboxyl groups, which comprises reacting at least one molecule of water with at least one dicarboxylic acid anhydride group of at least one suitable polymer. By "solventless" it is meant that the reaction medium comprises less than 5 weight percent, and typically less than 2 weight percent, and in some cases about zero weight percent, among other volatile organic compounds (V.O.C.).

The term liquid elastomer comprises elastomers having a flowable viscosity at a temperature between about 4° C. and about 95° C. at normal pressure.

Examples of suitable polymers comprise at least one unsaturated liquid polymer capable of forming an adduct with organic acid anhydride, including but not limited to polymers of various dienes, e.g., butadiene and its homologues such as isoprene and chloroprene, or copolymers of dienes with vinyl monomers such as styrene and its homologues, vinyl acetate and other vinyl esters or ethers, acrylonitrile and other (meth)acrylic monomers, and ethylene and its homologues. Such unsaturated polymers can be grafted or copolymerized with unsaturated organic acid anhydrides, such as maleic anhydride, itaconic anhydride, acrylic anhydride, aconitic anhydride, among others. Polymer molecular weights may be in the range of 500 to 100,000, typically between about 1,000 and about 80,000 g/mol. The quantity of anhydride groups may vary within broad limits depending on the type of the polymer and the intended applications. The quantity is generally between 1 and 80 moles of anhydride per polymer, and usually between about 2 and about 50 moles.

A polymeric adduct which can be employed in one aspect of this invention can comprise at least one unsaturated polymer such as polybutadiene or polyisoprene adducted with an organic acid anhydride such as maleic acid anhydride under conditions described in literature and known to the art, e.g., Trivedi, B. C. and Culbertson, R. M. "Maleic Anhydride" Plenum Press, NY, 1982; hereby incorporated by reference. Homopolymers of 1,3-butadiene and its homologues, or copolymers with up to about 95% of a comonomer can also be employed. Suitable comonomers comprise at least one vinyl-aromatic compounds, olefins having 2 to 12 carbon atoms and/or dienes having 4 to 12 carbon atoms, for example cycloalkadienes having 5 to 12 carbon atoms, such as dicyclopentadiene. Desirable comonomers comprise at least one of styrene, cyclopentadiene, norbornylene and ethylene. The amount of maleic anhydride should be sufficient to provide a polymer that contains at least 1 anhydride group, and typically greater than about 2 anhydride groups per molecule.

One aspect of the invention comprises a solventless method for preparing unsaturated carboxylic polymers. This method comprises reacting polymers adducted with carboxylic anhydride, e.g., maleic acid anhydride, with the equivalent amounts of water in the presence of at least one catalyst, e.g., a tertiary amine, toluenesulfonic acid, among others, to hydrolyze the anhydride moiety to form a substantially pure acid form.

Surprisingly, it was found that such a reaction can be done in a solventless process under normal pressure and mild temperature conditions without a prolong mixing of components. The solventless process is normally heated at a temperature for a time sufficient to achieve the desired results. Typically, the reaction temperature is in the range of between about 60° C. and about 110° C., typically between 70° C. and 100° C., and usually between 80° C. and 90° C. Although the viscosity of the reaction mixture is greatly increased in the course of the reaction, substantially no gel is formed. That means that the reaction products remain substantially soluble in a suitable organic solvent such as xylene or a ketone, e.g. methylethyl ketone, or an appropriate mixture of solvents.

This invention also provides uncured adhesive compositions comprising the aforementioned unsaturated carboxylic polymer adduct that can be formulated with cure initiators such as at least one of peroxides or sulfur and accelerators, and optionally other elastomers and additives, wherein said adduct comprises between about 1 and about 99 weight percent of said adhesive composition. In order to improve adhesive qualities, the composition can be vulcanized.

Another aspect of this invention relates to improved formulations of polymeric materials that are obtained by adding the aforementioned carboxylic polymer adducts, e.g., to achieve improved adhesive and physical properties of the compounded elastomers. As shown in the examples hereof, adhesive properties are improved with the relatively small addition of the carboxylic polymer to the composition during a compounding or formulating step and, typically, prior to vulcanization or cure. Examples of improved adhesion are E-coat to Nylon 66, Nylon 66 to itself, E-coat to itself, coatings on plastics (e.g., PETG, E-coat, and Nylon 66), metals (e.g., cold-rolled steel, galvanized steel and aluminum), adhesion through oil to cold-rolled steel, among other substrates and coating systems.

Adhesion is measured by means known to the art, such as lap shear test, e.g., ASTM D-816-70, and through subjective observations of the substrate after removing the adhered material by peeling, scraping, etc. The adhesive elastomers of this invention can exhibit lap shear adhesion to Nylon 66 between about 80 and about 500 lbf, and to E-coat between about 160 and about 600 lbf. Such adhesive strengths are far superior to the formulation that does not contain a carboxylic polymer of this invention.

Polymers useful in practicing the instant invention comprise at least one member selected from the group of styrene butadiene rubber (SBR), acrylonitrile butadiene rubber (NBR), hydrogenated acrylonitrile butadiene rubber (HNBR), polychloroprene rubber (CR), natural rubber (NR), polyisoprene rubber (IR), polybutadiene rubber (BR), isoprene isobutylene rubber (IIR), halogenated isoprene isobutylene rubber (CIIR, BIIR), fluorocarbon rubber (FKM), polyethylene and various ethylene copolymers, e.g. ethylene propylene diene rubber (EPDM), ethylene-vinyl acetate copolymer (EVA), ethylene-alkyl acrylate copolymers, ethylene propylene rubber (EPR), blends of two or more of such elastomers, among others.

The amount of inventive carboxylic polymer to be added to a formulation is sufficient to achieve a desired tack and/or adhesive bond of the elastomer to the substrate, and still provide an elastomer with satisfactory physical and chemical properties without adversely affecting the vulcanization rate and the ultimate cure of the elastomeric compound. For example, the adhesive adduct comprises between about 1 and about 25 weight percent of the mixture prior to curing, but may comprise more than 90 weight percent of the cured mixture.

An example of a method for making a curable adhesive elastomeric compositions of this invention comprises:

(a) mixing at least one liquid unsaturated polymer adducted with at least one carboxylic acid anhydride (e.g. Ricon 1756 of Ricon Resins, Inc.) with an equivalent amount of water and with at least one catalyst until a uniform cloudy blend is obtained or for about 15 minutes, optionally at a slightly elevated temperature. The catalysts comprises acid or base catalysts effective at anhydride ring opening reaction. Examples of such catalysts comprise at least one of bis(2-dimethylaminoethyl)ether (e.g. DABCO BL16 Catalyst of Air Products and Chemicals, Inc.), an amine salt of p-toluenesulfonic acid (e.g. BYK-451 of BYK Chemie or Nacure 2500 of King Industries, Inc.), among others. Desirable results are obtained by using the DABCO BL16 Catalyst, (b) pouring the cloudy blend from step (a) in a suitable leak-protected container, e.g., a plastic or rubber bag, or a plastic-lined fiber box;

(c) maintaining said container with the reaction mixture at a temperature of about 90° C. for about 2 hours or until a clear reaction product, e.g., the carboxylic adduct is formed; and, (d) adding said carboxylic adduct to an uncured formulation in an amount between about 1 and about 25 weight percent of said composition.

Curing agents may also be added to the mixture but may not be necessary when the uncured formulation is one which may be cured by the adduct, e.g., epoxy, amine, urethane, melamine resin, mixtures thereof, among others.

The carboxylic adduct is normally mixed with the uncured formulation prior to vulcanization. The best results are obtained when about 5–20 weight percent of the carboxylic adduct is used in the formulation. The unvulcanized formulation can be extruded, injection molded, or otherwise pre-formed, then placed on a substrate and heated to bring about cure.

DETAILED DESCRIPTION

The instant invention relates to combining unsaturated polymeric materials adducted with carboxylic acid anhydride with water and at least one catalyst to yield polymeric organic acid, which can be used to promote adhesion to a variety of substrates. These materials comprise at least one polymeric backbone bearing organic acid moieties attached as pendant groups to a polymeric chain. Examples of substrates that can be adhered comprise at least one member selected from the group of plastics, such as nylon, polyethylene terephthalate, polyethylene vinyl acetate, polyester, polyether, polyacrylate, and polycarbonate, or metals, such as cold rolled and galvanized steel and aluminum, among others.

In one aspect of the invention, the polymeric backbone comprises a polybutadiene or polyisoprene polymer with a molecular weight of between about 500 g/mol and about 100,000 g/mol, typically between about 800 g/mol and about 50,000 g/mol, e.g., sufficient to provide elastomeric properties to a final adducted product. Said polymeric backbone is adducted with pendant acid groups originated from the hydrolysis reaction of suitable carboxylic anhydride containing polymers. The latter are commercially available and produced by many manufacturers worldwide, e.g., Kuraray, Inc. (trademark LIR), Ricon Resins, a division of Sartomer (trademarks Ricon and Ricobond), Degussa Corporation (trademark Polyvest), and Rivertex Co., Ltd. of UK (trademark Lithene).

The polymers useful in this invention may bear additional functionality or groups, such as styrene moieties, which contribute to the physical properties of the polymer; but generally will not interfere with the polymer's ability to form organic acid adducts, or with the ability of the final product to form strong adhesive bonds to a substrate, or with the vulcanization reaction of the formulated compound. Examples of such non-interfering groups comprise at least one of methyl, ethyl, benzyl, tolyl, cyclohexyl, norbornyl, cyclopentadienyl, non-highly-reactive substituents such as cyano or halides, mixtures thereof, among others. The adducted unsaturated resins of this invention may comprise up to about 95 weight percent of such substituents, e.g., styrene, without interfering with the adhesiveness of the adduct.

The organic acid anhydride adducted to the polymers described above may be any suitable unsaturated anhydride. The polymeric backbone can be reacted with the organic acid anhydride by methods known to the art. Alpha, beta-ethylenically unsaturated dicarboxylic anhydrides, such as maleic anhydrides, are especially suitable for this invention as they can be easily adducted to unsaturated polymeric units and produce two carboxyl groups upon hydrolysis according the following general reaction:

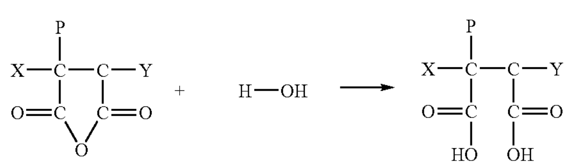

where P is a polymeric unit, and X and Y are hydrogen atoms or alkyl groups, and may be the same or different.

The carboxylic polymers of this invention can be compounded with other elastomers and additives by one of several methods known in this industry. These methods comprise at least one of roll mill, extruder and intensive internal mixers of the Banbury type, among others. After compounding, the materials may either be used immediately or stored for use at a later time. Most elastomers can be compounded during the formulating and mixing operations with cure packages. Methods for curing elastomers are similar to those used for the particular elastomer when no adhesion promoters corresponding to the materials of this invention are used.

The uncured but compounded elastomer mixtures have adequate storage stability when adhesion promoters of this invention are used. "Storage stability" is defined as resistance of the compounded elastomer to change with time in storage. Depending upon the concentration, storage environment, and additives used, the uncured but compounded elastomer can be stored for about 12 months.

The cured elastomers of this invention containing the adhesion promoter compositions described herein have superior properties of adhesion to a variety of elastomers, plastics, metals, mineral fillers, fibers, fabrics, ceramics, glass, paints and electrocoats among other substrates. The vulcanized elastomer has adequate to superior properties of adhesive strength and heat, cold, and moisture resistance depending upon the composition and the purpose for which the elastomeric compound was designed and formulated.

The uncured compounded mixture, in addition to the adhesion promoters of this invention and the elastomer to be cured, may contain other components and additives comprises at least one of carbon black, mineral fillers such as silica, talc, and calcium carbonate; metal oxides, such as zinc oxide and calcium oxide; curatives such as peroxides, sulfur, TMTD, MBTS, resin and quinone cures; co-accelerators, antioxidants, plasticizers, resins, various fibers, such as nylon, cotton, and cellulose fiber, fiberglass, and mixtures thereof among others.

In curing with the adhesion promoters of this invention the temperature is typically similar to that at which the formulation would normally be cured without the introduction of the adhesion promoter, e.g., between about 90° C. and about 300° C., depending on the type and amount of curing agent and intended application.

The following Examples are provided to illustrate this invention and not to limit the scope of the invention as defined in the appended claims.

EXAMPLES

Examples 1–5 illustrate the method that prepared carboxylic polymers from maleic anhydride adducts listed in Table 1 below.

Example 1

118 g of Ricon 1756, a Viscous liquid polybutadiene adducted with 17 weight percent of maleic anhydride were placed in a plastic beaker. The polymer was warmed to about 50° C. and 3.7 g of water and 1.2 g of DABCO® BL16 Catalyst were added to the beaker. The components were hand-stirred with a spatula at 50° C. for about 15 minutes until a cloudy, viscous, liquid blend was obtained. The blend was poured into a plastic bag, closed to prevent leaking, and placed it in an oven preheated to 90° C. In about 25 minutes the mixture in the bag became semi-transparent. The reaction continued at 90° C. for another 25 minutes, then the bag with the now transparent reaction product was removed from the oven and cooled down at room temperature. The reaction product is a transparent brittle thermoplastic solid, fully soluble in xylene.

In the following examples the carboxylic polymers were prepared in accordance with the method described in Example 1.

Example 2

100 g of Ricobond 2031, 3.7 g of water and 1 g of DABCO® BL16 Catalyst were poured into a plastic beaker. Stirred the components at 50° C., until a cloudy, viscous, liquid blend was obtained. Poured the blend into a plastic bag and placed it in the oven preheated to 80° C. for about 70 minutes. Removed the bag from the oven and cooled down at room temperature. The reaction product is a transparent limber solid, fully soluble in methylethyl ketone.

Example 3

113 g of Ricobond 1731, 3.5 g of water and 1.2 g of Nacure 9500 catalyst were placed in a plastic beaker. Mixed the components at room temperature to obtain a cloudy, viscous, liquid blend. Poured the blend into a plastic bag and placed it in the oven preheated to 90° C. for 60 minutes. Removed the bag from the oven and cooled down at room temperature. The reaction product is a transparent, tacky, soft solid, fully soluble in xylene.

Example 4

120 g of Ricobond 1031, 2.2 g of water and 1.2 g of BYK-451 catalyst were placed in a plastic beaker. Mixed the components at room temperature to obtain a cloudy liquid blend. Covered the beaker with aluminum foil and placed it in the oven preheated to 80° C. for 100 minutes. Removed the beaker from the oven and cooled down at room temperature. The reaction product is a very tacky, transparent, viscous liquid, fully soluble in xylene.

Example 5

200 g of LIR-403, 0.6 g of water and 2 g of DABCO® BL16 Catalyst were placed into a plastic beaker. Mixed the components to obtain a cloudy liquid blend. Covered the beaker with aluminum foil and placed it in the oven preheated to 90° C. for 120 minutes. Removed the beaker from the oven and cooled down at room temperature. The reaction product is a transparent, tacky, viscous liquid, fully soluble in xylene.

Examples 6–7 illustrate individual adhesiveness of Carboxylic Polymers that were formed in accordance with the invention.

Example 6

60 g of the solid carboxylic polymer (Example 1) and 30 g of xylene were placed in a plastic beaker. After the polymer dissolved, added 0.6 g of a curing agent TBP-XL (tert-butylperoxybenzoate) and mixed it with the polymeric solution. Coated the mixture onto substrates of pre-cleaned cold-rolled steel (CRS), PETG, and CRS covered with a thin layer of the protective oil Ferrocote-61 MALHCL1. Allowed xylene to evaporate, placed coated substrates in the preheated oven and cured for 15 minutes at 135° C., then 15 minutes at 145° C. Removed the substrates from the oven and tested the adhesion according to Tape Adhesion Test ASTM D-5359. The cured formulation produces a clear, glossy coating with 100% adhesion to all substrates.

Example 7

50 g of carboxylic polymer (Example 4) were placed in a tin and warmed at 70° C. to reduce the viscosity and then mixed with 0.6 g of DiCup-40C (dicumyl peroxide, 40% on calcium carbonate). Warmed the substrates (aluminum, Nylon 66, and galvanized steel) to about 70° C., painted the formulation onto substrates and cured for 30 minutes at 165° C. Removed the substrates from the oven and tested the adhesion according to Tape Adhesion Test ASTM D D-3359. The cured formulation produces a clear, glossy coating with 100% adhesion to all substrates.

Examples 8–9 illustrate effect of the carboxylic polymers of this invention in a sulfur-cured adhesive formulations.

Example 8

Control 1

In a small Baker-Perkins double-aim dispersion blades mixer prepared a control formulation using the components listed below.

| Component | Amount, grams |
|---|---|
| Styrene-Butadiene Rubber | 400 |
| Liquid Polyisoprene Resin | 180 |
| Titanium Dioxide | 28 |
| Stearic Acid | 12 |

TABLE 1

PROPERTIES OF UNSATURATED POLYMERS USED IN EXAMPLES 1–5 TO PREPARE CARBOXILIC POLYMERS

| No. | Tradename | Polymeric backbone | Polymer Structure. % 1,2-bonding | Polymer Structure. % 1,4-bonding | Polymer Molecular Weight, g/mole | MAN[(1)] Weight percent | Supplier |
|---|---|---|---|---|---|---|---|
| 1. | Ricon 1756 | PB[(2)] | 70 | 30 | 2,400 | 17 | Ricon Resins, Inc. |
| 2. | Ricon 2031 | PB[(2)] | 30 | 70 | 6,200 | 20 | Ricon Resins, Inc. |
| 3. | Ricon 1731 | PB[(2)] | 30 | 70 | 6,000 | 17 | Ricon Resins, Inc. |
| 4. | Ricon 1031 | PB[(2)] | 30 | 70 | 5,600 | 10 | Ricon Resins, Inc. |
| 5. | LIR-403 | PI[(3)] | <1 | >91 | 25,300 | 1.2 | Kuraray America |

(1)MAN - maleic anhydride
(2)PB - polybutadiene
(3)PI - polyisoprene

-continued

| Component | Amount, grams |
|---|---|
| Calcium Oxide | 34 |
| Zinc Oxide | 29 |
| Sulfur | 29 |
| Cure Accelerator 1 | 3 |
| Cure Accelerator 2 | 11.4 |

Mixed the formulation to obtain a smooth uniform blend. Using, a hot press at 77° C., prepared 2 mm thick strips of the control formulation.

Placed the strips on CRS, Nylon 66, Aluminum, and oiled CRS and cured at 165° C. for 1 hr. Allowed cured samples to cool down for 2 hrs and tested adhesion by pulling the cured strips from the substrates. All strips of the control formulation showed no resistance to pull and separated from the substrates leaving a clean surface.

The following formulations are prepared, cured and tested in accordance with the method described in Example 8, unless otherwise described.

Example 9

Mixed the control formulation (Example 8) with the carboxylic polymer of this invention (Example 3) and proportional additional amounts of curatives and fillers as follows.

| Component | Amount, grams |
|---|---|
| Control 1 (Example 8) | 300 |
| Carboxylic polymer (Example 3) | 100 |
| Titanium Dioxide | 6 |
| Stearic Acid | 2.6 |
| Calcium Oxide | 7.4 |
| Zinc Oxide | 6.3 |
| Sulfur | 6.3 |
| Cure Accelerator 1 | 0.7 |
| Cure Accelerator 2 | 2.5 |

Cured the strips of formulation 9 on CRS, Nylon 66, Aluminum, and oiled CRS and tested as described in Example 8. In contrast to control, the cured formulation containing carboxylic polymer showed high resistance to pull in all samples and separated from the substrates cohesively leaving a layer of the adhered cured material on the substrate.

Examples 10–13 illustrate application of carboxylic polymers of this invention in peroxide-cured adhesive formulations.

Example 10

Control 2

| Component | Amount, grams |
|---|---|
| Ethylene Vinyl Acetate copolymer | 207 |
| Hydrocarbon Tackifier | 11.6 |
| Cure coagent | 6.3 |
| Iron powder | 68.4 |
| Dicumyl peroxide, 40% active | 4.2 |

Mixed all components to obtain a smooth uniform blend. Using a hot press prepared 1 mm thick strips of the control formulation.

Placed the strips on CRS, Nylon 66, Aluminum, E-coat and oiled CRS, cured at 165° C. for 30 minutes and tested adhesion by pulling the cured strips from the substrates. Samples on Nylon 66, Aluminum, and oiled CRS showed no resistance to pull and separated from the substrates leaving a clean surface. Samples on CRS and E-coat showed moderate resistance to pull, but also separated from the substrates leaving almost clean surfaces.

Example 11

Mixed control formulation 10 with carboxylic polymer of this invention (Example 2) and proportional additional amounts of the curative as follows.

| Component | Amount, grams |
|---|---|
| Control 2 (Example 10) | 207 |
| Carboxylic polymer (Example 2) | 42 |
| Dicumyl peroxide, 40% | 0.5 |

Cured 1 mm thick strips of the formulation on CRS, Nylon 66, Aluminum, E-coat, and oiled CRS at 165° C. for 30 minutes. All cured samples showed high resistance to pull and separated from the substrates cohesively leaving a layer of adhered material on the substrate.

Formulation 11 was also tested for adhesion between Nylon 66 and E-coat. Test samples were prepared and lap-shear test was performed in accordance with ASTM D-816-70.

Samples were cured at 165° C. for 30 minutes. Some cured samples were then treated for 500 hrs in salt-fog bath at 50° C. and some were heat-aged for 90 minutes at 199° C. to test the stability of the adhesive bond. The adhesion was measured as ultimate load resulting in separation of the substrates. Results are as follows.

| Adhesion of Nylon 66 to E-coat | Ultimate load, lbf |
|---|---|
| Initial | 285 |
| After 500 hrs salt-fog bath | 103 |
| After 90 minutes at 199° C. | 61 |

Formulations 12 and 13 were tested for initial adhesion in bonding Nylon 66 and E-coat to itself in different cure conditions. Results are presented in Table 2 below.

Example 12

| Component | Amount, grams |
|---|---|
| Ethylene - Vinyl Acetate copolymer | 165.3 |
| Styrene-Butadiene Rubber | 33 |
| Carboxylic polymer (Example1) | 29.4 |
| Cure coagent | 21.3 |
| Cellulose fiber | 33 |
| Calcium Carbonate | 14.4 |
| Dicumyl peroxide, 40% active | 3.3 |

Example 13

| Component | Amount, grams |
|---|---|
| Ethylene - Vinyl Acetate copolymer | 105 |
| Styrene-Butadiene Rubber | 30 |
| Carboxylic polymer (Example1) | 27 |
| Cure coagent | 21 |
| Cellulose fiber | 9.6 |
| Iron powder | 90 |
| Calcium Carbonate | 15 |
| Dicumyl peroxide, 40% active | 2.4 |

TABLE 2

| | INITIAL ADHESION OF E-COAT AND NYLON 66 TO ITSELF | | | | |
|---|---|---|---|---|---|
| | Adhesion strength in various cure conditions measured as ultimate load, lbf | | | | |
| Formulation | Substrate | Adhesive layer thickness | 121° C./35 min. | 143° C./30 min. | 177° C./20 min |
| Example 12 | E-coat | 0.5 mm | 329.7 | 538.5 | 235.4 |
| | Nylon 66 | | 186.6 | 508.7 | 330.2 |
| | E-coat | 2 mm | 164.3 | 360.3 | 613.2 |
| | Nylon 66 | | 165.6 | 394.4 | 574.5 |
| Example 13 | E-coat | 0.5 mm | 283.5 | 513.0 | 500.7 |
| | Nylon 66 | | 231.9 | 379.3 | 401.3 |
| | E-coat | 2 mm | 194.4 | 376.1 | 79.2 |
| | Nylon 66 | | 176.1 | 214.0 | 0.0 |

The invention has been described with reference to certain aspects. These aspects can be employed alone or in combination. Modifications and alterations will occur to others upon a reading and understanding of this specification. It is intended to include all such modifications and alterations insofar as they come within the scope of the appended claims or the equivalents thereof.

What is claimed is:

1. A method of making a carboxylic polymer, said method comprising:

a). forming a reaction medium comprising water and at least one liquid elastomer having at least one dicarboxylic acid anhydride group per molecule, said reaction medium containing about zero weight percent volatile organic compounds; and b). heating said reaction medium for a time and under conditions sufficient to hydrolyze said at least one dicarboxylic acid anhydride group.

2. The method of claim 1, wherein said reaction medium additionally comprises at least one catalyst.

3. The method of claim 1, wherein said reaction medium additionally comprises at least one catalyst selected from the group consisting of tertiary amines, toluenesulfonic acid, and amine salts of p-toluenesulfonic acid.

4. The method of claim 1, wherein said liquid elastomer is an adduct of an organic acid anhydride and an unsaturated liquid polymer.

5. The method of claim 1, wherein said liquid elastomer is an adduct of maleic anhydride and an unsaturated liquid polymer.

6. The method of claim 1, wherein said liquid elastomer is an adduct of an organic acid anhydride and an unsaturated liquid polymer which is a polymer or copolymer of at least one diene selected from the group consisting of butadiene, isoprene and chloroprene.

7. The method of claim 1, wherein said liquid elastomer has at least two dicarboxylic acid anhydride groups per molecule.

8. The method of claim 1, wherein said heating in step b) is carried out at a temperature between about 60 degrees C. and about 110 degrees C.

9. The method of claim 1, wherein said liquid elastomer is a copolymer of at least one unsaturated organic acid anhydride and at least one diene.

10. A method of making a cured adhesive elastomeric composition, said method comprising:

a). compounding the carboxylic polymer obtained in accordance with claim 1 with at least one curing agent to obtain a curable adhesive elastomeric composition; and b). heating said curable adhesive elastomeric composition to form said cured adhesive elastomeric composition.

11. The method of claim 10, wherein said carboxylic polymer is additionally compounded in step a) with at least one elastomer.

12. The method of claim 10, wherein said carboxylic polymer comprises from about 1 to about 25 weight percent of said curable adhesive elastomeric composition.

13. The method of claim 10, wherein said carboxylic polymer is additionally compounded in step a) with at least one elastomer selected from the group consisting of styrene-butadiene rubber, acrylonitrile-butadiene rubber, hydrogenated acrylonitrile-butadiene rubber, polychloroprene rubber, natural rubber, polyisoprene rubber, polybutadiene rubber, isoprene-isobutylene rubber, halogenated isoprene-isobutylene rubber, fluorocarbon rubber, polyethylene, ethylene-propylene-diene rubber, ethylene-vinyl acetate rubber, ethylene-alkyl acrylate copolymers, and ethylene-propylene rubber.

14. The method of claim 10, wherein the curable adhesive elastomeric composition is contacted with a substrate prior to step b).

* * * * *